(12) United States Patent
Morselli

(10) Patent No.: US 11,946,539 B2
(45) Date of Patent: Apr. 2, 2024

(54) SYSTEMS FOR COUPLING DEVICE

(71) Applicant: Dana Motion Systems Italia S.R.L., Reggio Emilia (IT)

(72) Inventor: Riccardo Morselli, Piandelagotti (IT)

(73) Assignee: DANA MOTION SYSTEMS ITALIA S.R.L., Reggio Emilia (IT)

( * ) Notice: Subject to any disclaimer, the term of this patent is extended or adjusted under 35 U.S.C. 154(b) by 0 days.

(21) Appl. No.: 17/804,994

(22) Filed: Jun. 1, 2022

(65) Prior Publication Data
US 2022/0403927 A1 Dec. 22, 2022

Related U.S. Application Data

(60) Provisional application No. 63/212,561, filed on Jun. 18, 2021.

(51) Int. Cl.
| | | |
|---|---|---|
| F16H 57/02 | (2012.01) | |
| B60K 17/12 | (2006.01) | |
| F16H 57/025 | (2012.01) | |
| H02K 7/116 | (2006.01) | |

(52) U.S. Cl.
CPC ........... *F16H 57/025* (2013.01); *B60K 17/12* (2013.01); *H02K 7/116* (2013.01); *F16H 2057/02034* (2013.01)

(58) Field of Classification Search
CPC .... B60K 17/356; B60K 7/0007; B60K 17/12; B60K 1/02; F16H 57/025; F16H 2057/02034; H02K 7/116
See application file for complete search history.

(56) References Cited

U.S. PATENT DOCUMENTS

| | | | | |
|---|---|---|---|---|
| 1,660,669 | A * | 2/1928 | Froesch | B60K 1/02 475/5 |
| 1,661,780 | A * | 3/1928 | Warhus | B60K 1/02 180/65.6 |
| 1,678,799 | A * | 7/1928 | Axel | B60K 1/02 74/661 |
| 6,823,961 | B2 * | 11/2004 | Lamela | B60K 17/356 180/242 |
| 6,893,371 | B2 | 5/2005 | Mills et al. | |
| 9,434,413 | B1 * | 9/2016 | Keller | B62D 7/18 |
| 10,787,073 | B2 | 9/2020 | MacKenzie et al. | |
| 2009/0014223 | A1 * | 1/2009 | Jones | B60K 17/16 903/903 |
| 2018/0257485 | A1 * | 9/2018 | Vincon | B60K 17/12 |

FOREIGN PATENT DOCUMENTS

JP 2013044406 A 3/2013

* cited by examiner

*Primary Examiner* — Thomas C Diaz
(74) *Attorney, Agent, or Firm* — McCoy Russell LLP

(57) ABSTRACT

Methods and systems are provided for a coupling device. In one example, a system comprises a coupling device arranged between a gearbox and a motor, wherein the coupling device is further coupled to a vehicle frame.

15 Claims, 4 Drawing Sheets

SYSTEMS FOR COUPLING DEVICE

CROSS REFERENCE TO RELATED APPLICATION

The present application claims priority to U.S. Provisional Application No. 63/212,561, entitled "SYSTEMS FOR COUPLING DEVICE", and filed on Jun. 18, 2021. The entire contents of the above-listed application are hereby incorporated by reference for all purposes.

TECHNICAL FIELD

The present description relates generally to a coupling device for a gearbox and an electric motor.

BACKGROUND AND SUMMARY

As vehicle packaging becomes more compact, components may be combined. This may increase a burden on coupling devices as they are now demanded to support multiple components. While this may reduce packaging sizes and vehicle weight, components may be insufficiently supported.

For example, an electric motor may be flanged to a gearbox to save space. Hydraulic motors may be packaged in a similar arrangement with the gearbox. Motors may increase in size to reach higher torque and power demands, for example, in commercial vehicles, large passenger trucks, and the like. The coupling used for smaller gearboxes and motors may not be used with larger motors due to insufficient structural strength. As such, a new coupling may be desired as electric proliferation of vehicles increases.

In one example, the issues described above may be addressed by a system for a coupling device arranged between a gearbox and a motor, wherein the coupling device is further coupled to a vehicle frame. In this way, the coupling device may couple the motors to the gearbox and mount the combination of the gearbox and motors to the vehicle frame.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
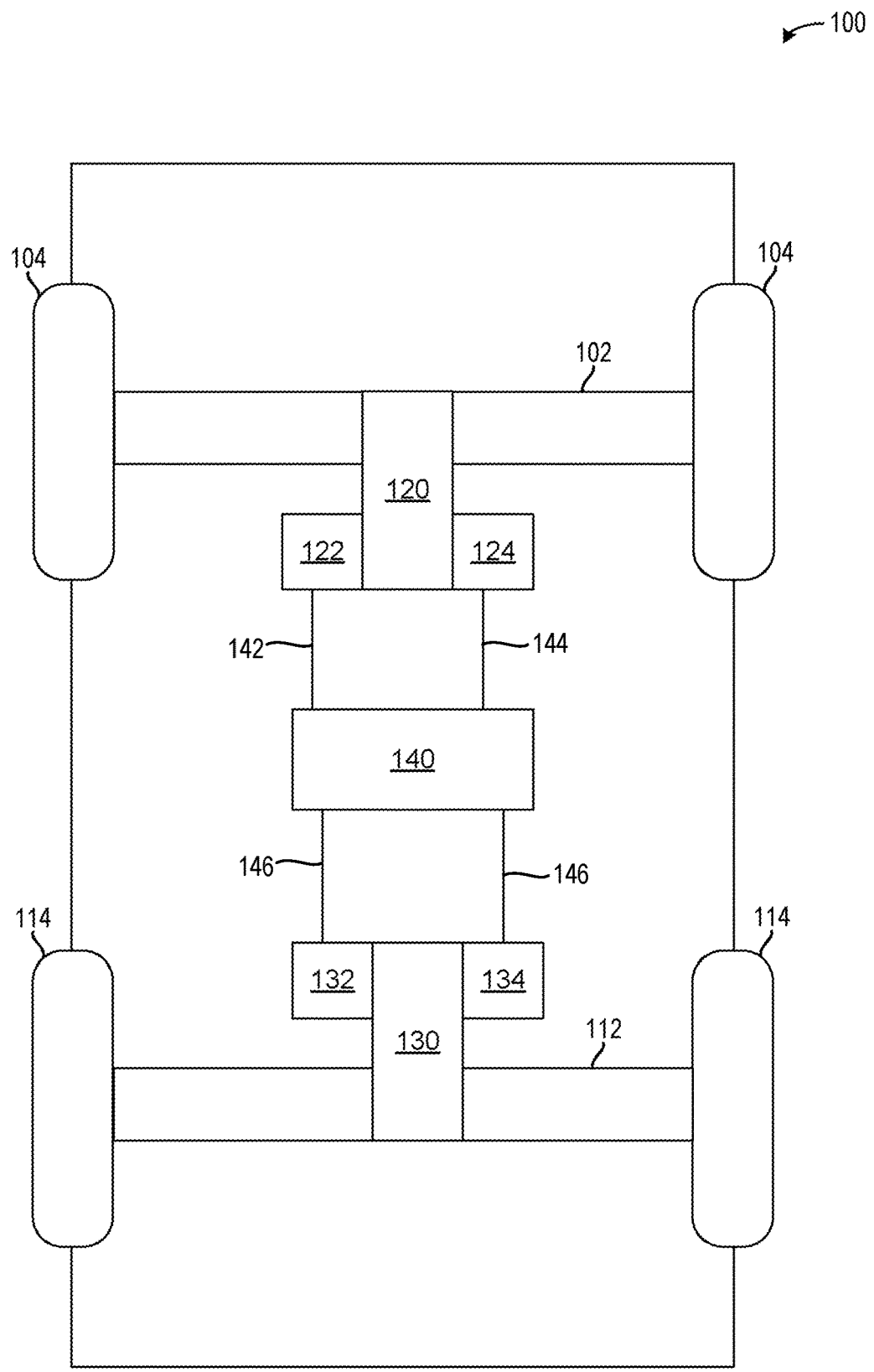
FIG. 1 shows a vehicle architecture.
Figure 2:
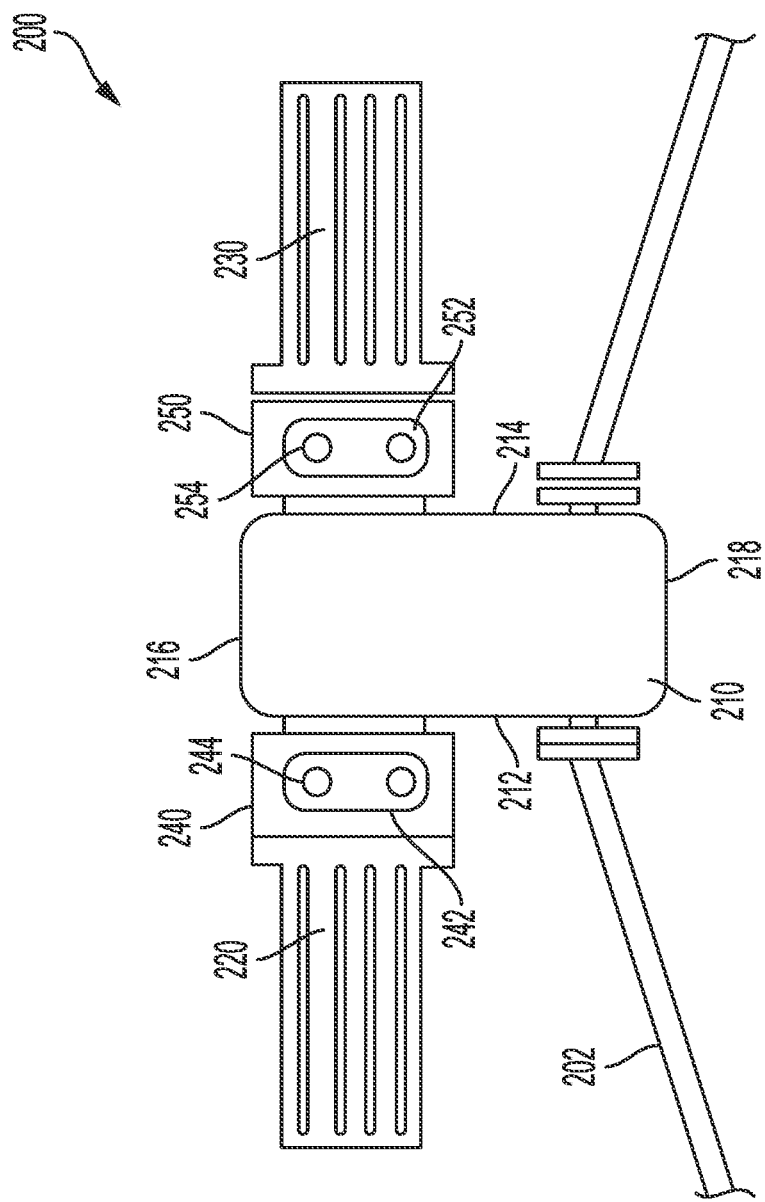
FIG. 2 shows an example of electric motors coupled to a gearbox via a pair of coupling devices.
Figure 3:
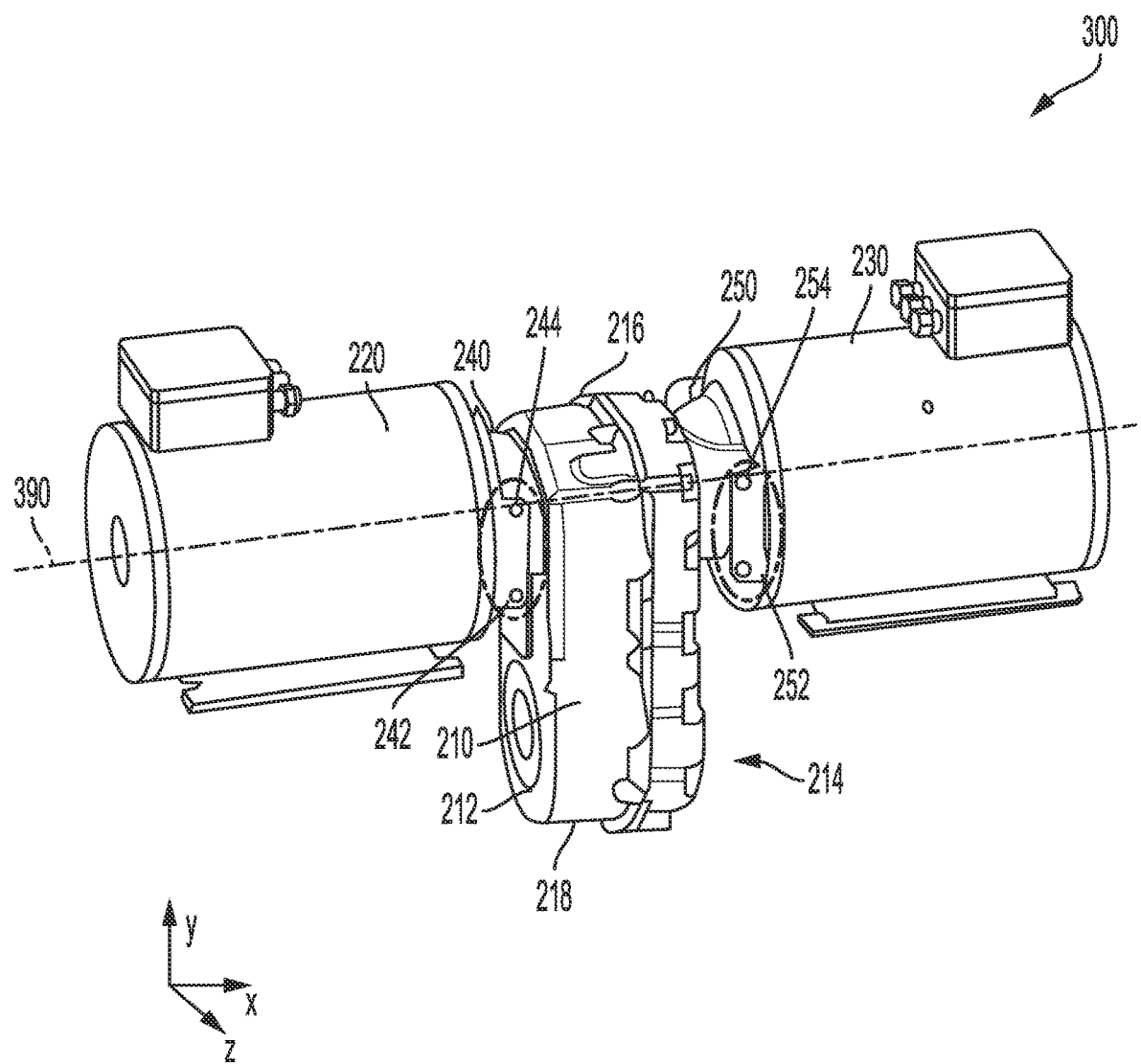
FIG. 3 shows a detailed example of coupling between the electric motors and the gearbox.
Figure 4A:
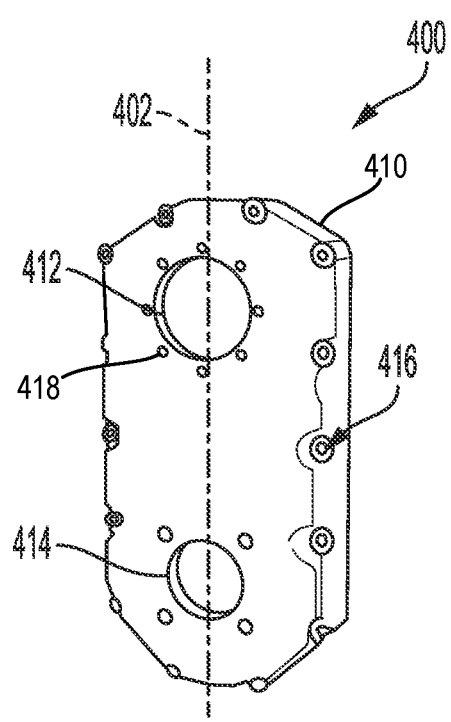
FIGS. 4A and 4B show a detailed example of a first side and a second side of a coupling device, respectively.
Figure 4B:
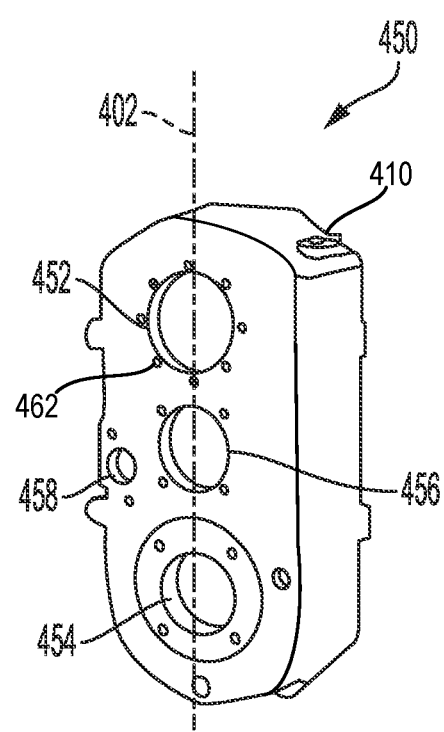

The following description relates to a coupling for connecting a gearbox and one or more motors to a vehicle frame. The coupling may be used in a vehicle architecture as shown in FIG. 1. Examples of the coupling interfacing with the gearbox and one or more motors is shown in FIGS. 2 and 3. A detailed view of the of the coupling device is shown in FIGS. 4A and 4B.

FIGS. 1-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2 to 4B are shown approximately to scale. Other dimensions may be used if desired.

Turning now to FIG. 1, it shows a vehicle 100 comprising a first shaft 102 and a second shaft 112. The first shaft 102 may be configured to drive a first set of wheels 104 and the second shaft 112 may be configured to drive a second set of wheels 114. In one example, the first shaft 102 is arranged near a front of the vehicle 100 and the second shaft 112 is arranged near a rear of the vehicle 100.

A first gearbox 120 may be coupled to the first shaft 102. A first motor 122 and a second motor 124 may be coupled to the first gearbox 120. A second gearbox 130 may be coupled to the second shaft 112. A third motor 132 and a fourth motor 134 may be coupled to the second gearbox 130. In one example, the first motor 122, the second motor 124, the third motor 132, and the fourth motor 134 may be electric motors electrically coupled to a battery 140 or other energy storage device. Additionally or alternatively, an inverter may be arranged between the battery 140 and the electric motors. More specifically, a first line 142 may electrically couple the battery 140 to the first motor 122, a second line 144 may electrically couple the battery 140 to the second motor 124, a third line 146 may electrically couple the battery 140 to the third motor 126, and a fourth line 148 may electrically couple the battery to the fourth motor 128. In one example, each of the electric motors may be configured to propel the vehicle in a motor mode and provide power to the battery 140 in a regenerative braking mode.

The vehicle 100 is illustrated as an all-electric vehicle comprising one or more batteries for powering one or more electric motors to drive the vehicle. In one example, the vehicle 100 is an all-electric passenger vehicle. In some examples, additionally or alternatively, the vehicle 100 may be a hybrid vehicle including an engine configured to supply power to one or more of the first shaft 102 and the second shaft 112.

Turning now to FIG. 2, it shows an embodiment 200 illustrating a gearbox 210 mounted to a drive shaft 202. The drive shaft 202 may include two arms extending toward the gearbox 210. In one example, the arms extend in a direction away from a first motor 220 and a second motor 230. The gearbox 210, the drive shaft 202, the first motor 220, and the second motor 230 may be identical to the first gearbox 120, the first shaft 102, the first motor 122, and the second motor 124 of FIG. 1, respectively. Additionally or alternatively, the gearbox 210, the drive shaft 202, the first motor 220, and the second motor 230 may be identical to the second gearbox 130, the second shaft 112, the third motor 132, and the fourth motor 134 of FIG. 1, respectively. The first motor 220 and the second motor 230 may be coupled to the gearbox 210 via a first coupling 240 and a second coupling 250, respectively.

The first motor 220 may be coupled to a first side 212 of the gearbox 210 via the first coupling 240. The second motor 230 may be coupled to a second side 214 of the gearbox 210 via the second coupling 250, wherein the second side 214 is opposite the first side 212. The first motor 220 and the second motor 230 may be coupled to portions of the first side and the second side adjacent to a first extreme end 216. The first extreme end 216 is opposite to a second extreme end 218, wherein the driveshaft 202 extends through the first side 212 and the second side 214 adjacent to the second extreme end 218.

The first coupling 240 may include a first coupling area 242. The second coupling 250 may include a second coupling area 252. The first coupling area 242 and the second coupling area 252 may include one or more through holes. The through holes may be configured to receive a fastener or other coupling device, wherein the fastener may physically couple a vehicle frame. More specifically, the first coupling area 242 may include first through holes 244 configured to receive bolts, screws, or other types of fasteners. Similarly, the second coupling area 252 may include second through holes 254 configured to receive bolts, screw, or other types of fasteners. A number, size, and spacing of the first through holes 244 may be identical to the second through holes 254.

In one example, the first through holes 244 and the second through holes 254 may face a direction normal to a direction of vehicle travel. As such, fasteners engaging with the through holes may extend in the direction normal to the direction of vehicle travel. Additionally or alternatively, the fasteners, and therefore the through holes, may extend in a direction parallel to the direction of vehicle travel, in some embodiments.

The first coupling 240 and the second coupling 250 may include a flange shape. That is to say, each of the first coupling 240 and the second coupling 250 may include a protruded ridge, lip, or rim extending from a flat rim, collar, or rib. By doing this, a strength of the first coupling 240 and the second coupling 250 may be increased.

In this way, FIG. 2 illustrates a portion of a drivetrain of a vehicle including a driveshaft, at least one electric motor, a gearbox, and a coupling device configured to mount the at least one electric motor to the gearbox, the coupling device further comprising a plurality of through holes, each configured to receive a threaded end of a bolt and physically couple the coupling device to a frame of the vehicle. A number of coupling devices may be equal to a number of electric motors. For example, if the at least one electric motor is a first electric motor and the coupling device is a first coupling device, then the drivetrain may further includes a second electric motor and a second coupling device configured to mount the second electric motor to the gearbox at a side opposite a side to which the first electric motor is coupled, the second coupling device comprising a plurality of through holes, each configured to receive a threaded end of a bolt and physically couple the second coupling device to the frame of the vehicle. The plurality of through holes of the coupling devices face a direction parallel to a direction of vehicle travel. The coupling devices comprise the plurality of through holes on opposite sides facing away from the at least one electric motor and the gearbox. In one example, only the coupling devices couple the gearbox and electric motor to the vehicle frame. The gearbox is free of mounting points and does not directly couple to the frame.

Turning now to FIG. 3, it shows an embodiment 300 of the gearbox 210, the first electric motor 220, and the second electric motor 230 in a mounted position. The embodiment 300 is described in relation to x-, y-, and z-axes. The x-axis is parallel to a horizontal direction, the y-axis is parallel to a vertical direction, a z-axis perpendicular to each of the x- and y-axes.

In one example, a vehicle in which the gearbox 210, the first electric motor 220, and the second electric motor 230 are arranged may travel in a direction parallel to the z-axis. The first through holes 244 may receive a threaded end of a bolt, a screw, or other fastener in a direction parallel to the z-axis. The second through holes 254 may receive a threaded end of a bolt, a screw, or other fastener in the direction parallel to the z-axis and normal to a central axis 390 of the first electric motor 220 and the second electric motor 230. The threaded bolts may physically couple the gearbox 210 to a vehicle frame. Thus, in one example, the plurality of fasteners may extend in a direction parallel to a direction of forward vehicle travel. Additionally or alternatively, the plurality of fasteners may be rotated normal to the direction of vehicle travel such that they lie in a plane orthogonal to the direction of vehicle travel.

The first coupling area 242 and the second coupling area 252 may protrude away from the first and second coupling devices 240, 250, respectively, in the direction parallel to the z-axis and normal to the central axis 390.

In the example of FIG. 3, additional through holes may be arranged on an opposite side of the first coupling device 240 and the second coupling device 250. More specifically, a first side of the first and second coupling devices is illustrated in FIG. 3, exposing the first through holes 244 and the second through holes 254. A second side of the first and second coupling devices, opposite to the first side, may further include through holes configured to mount to a vehicle frame via a plurality of fasteners, as illustrated in FIG. 2.

In one example, the first coupling area 242 may correspond to a protrusion extending from the first coupling device 240. The first coupling area 242 may be physically coupled to the first coupling device 240 via adhesives, welds, fusion, fasteners, or the like. Additionally or alternatively, the first coupling area 242 and the first coupling device 240 may be manufactured as a single piece via a mold, additive manufacturing, or other similar process. In one example, additionally or alternatively, the first coupling device 240 may be manufactured as a single piece, via a mold and/or additive manufacturing.

The opposite side may include a coupling area including through holes similar to the first through holes 244 or the second through holes 254. In some examples, a number and/or a size the through holes on the opposite side may be equal to a number of first through holes 244. In one example, there are exactly two of each of the first through holes 244 and the through holes on the opposite side.

Turning now to FIGS. 4A and 4B, they show a first side 400 and a second side 450 of a housing 410 of a gearbox, such as gearbox 210 of FIG. 2. The housing 410 may include a first upper opening 412 for coupling to a first electric motor and a first coupling device at the first side 400. The housing 410 may further include a second upper opening 452 for coupling to a second electric motor and a second coupling device at the second side 450.

The housing 410 may also include a first lower opening 414 for coupling to a shaft at the first side 400. The housing 410 may further include a second lower opening 454 for coupling to a shaft at the second side 450. The housing 410 is free of openings or other features for coupling to a frame of the vehicle. As such, the gearbox may not be directly coupled to the frame.

The first side 400 of the housing 410 further includes a plurality of openings 416 arranged around a perimeter thereof. Each of the plurality of openings 416 may receive a fastener configured to thread or couple to a corresponding opening arranged on the second side 450.

The first coupling device (e.g., the first coupling device 240 of FIGS. 2 and 3) may physically couple to the first side 400 of the housing 410 via a plurality of fasteners mating with a plurality of first upper openings 418. The plurality of first upper openings 418 may be symmetrically spaced about the first upper opening 412.

The second coupling device (e.g., the second coupling device 250 of FIGS. 2 and 3) may physically couple to the second side 450 of the housing 410 via a plurality of fasteners mating with a plurality of second upper openings 462. The plurality of second upper openings 462 may be symmetrically spaced about the second upper opening 452.

The housing 410 may further include a first central opening 458 configured to interconnect a gear shift actuator on the second side 450. A second central opening 456 may be arranged for simplified assembly and maintenance. The second central opening 456 may be more central than the first central opening 458. Additionally or alternatively, the second central opening 456 may be larger than the first central opening 458.

The disclosure provides support for a system including a coupling device arranged between a gearbox and a motor, wherein the coupling device is further coupled to a vehicle frame. A first example of the system further includes where the coupling device comprises a plurality of first through holes on a first side configured to couple to the vehicle frame via a first plurality of fasteners. A second example of the system, optionally including the first example, further includes where the coupling device further comprises a plurality of second through holes on a second side opposite the first side, wherein the plurality of second through holes are configured to couple to the vehicle frame via a second plurality of fasteners. A third example of the system, optionally including one or more of the previous examples, further includes where the first plurality of fasteners and the second plurality of fasteners extend perpendicular to an axis parallel to a direction of forward vehicle travel. A fourth example of the system, optionally including one or more of the previous examples, further includes where the coupling device is a first coupling device arranged between the gearbox and a first motor, further comprising a second coupling device arranged between the gearbox and a second motor. A fifth example of the system, optionally including one or more of the previous examples, further includes where the motor is an electric motor, and wherein the vehicle frame is an electric vehicle frame. A sixth example of the system, optionally including one or more of the previous examples, further includes where the coupling device is a flange. A seventh example of the system, optionally including one or more of the previous examples, further includes where the coupling device couples to a portion of the vehicle frame above a driveshaft. An eighth example of the system, optionally including one or more of the previous examples, further includes where the driveshaft extends through first and second sides of the gearbox, wherein the coupling device is arranged on one of the first side or the second side of the gearbox.

The disclosure further provides support for an electric vehicle including a gearbox, a first electric motor and a second electric motor, and a first coupling device arranged between the first electric motor and the gearbox and a second coupling device arranged between the second electric motor and the gearbox, wherein the first coupling device comprises a plurality of through holes arranged on opposite sides thereof, the plurality of through holes configured to mount the first coupling device to a frame of the electric vehicle via a plurality of fasteners. A first example of the electric vehicle further includes where the second coupling device comprises a plurality of through holes arranged on opposite sides thereof, the plurality of through holes configured to mount the second coupling device to the frame of the electric vehicle via the plurality of fasteners. A second example of the electric vehicle, optionally including the first example, further includes where the plurality of fasteners extends in a direction normal to a central axis of the first and second electric motors. A third example of the electric vehicle, optionally including one or more of the previous examples, further includes where the first coupling device mounts the first electric motor to a first side of the gearbox, and wherein the second coupling device mounts the second electric motor to a second side of the gearbox. A fourth example of the electric vehicle, optionally including one or more of the previous examples, further includes where the plurality of fasteners extends through the frame and thread into the plurality of through holes of the first coupling device. A fifth example of the electric vehicle, optionally including one or more of the previous examples, further includes where only the first coupling device and the second coupling device mount the gearbox, the first electric motor, and the second electric motor to the frame.

The disclosure further provides support for a drivetrain of a vehicle including a driveshaft, at least one electric motor, a gearbox, and a coupling device configured to mount the at least one electric motor to the gearbox, the coupling device further comprising a plurality of through holes, each configured to receive a threaded end of a bolt and physically couple the coupling device to a frame of the vehicle. A first example of the drivetrain further includes where the at least one electric motor is a first electric motor and the coupling device is a first coupling device, further comprising a second electric motor and a second coupling device configured to mount the second electric motor to the gearbox at a side opposite a side to which the first electric motor is coupled, the second coupling device comprising a plurality of through holes, each configured to receive a threaded end of a bolt and physically couple the second coupling device to the frame of the vehicle. A second example of the drivetrain, optionally including the first example, further includes where the plurality of through holes face a direction normal to a direction of vehicle travel. A third example of the drivetrain, optionally including one or more of the previous examples, further includes where the coupling device comprising the plurality of through holes on opposite sides facing away from the at least one electric motor and the gearbox. A fourth example of the drivetrain, optionally including one or more of the previous examples, further includes where the gearbox is free of mounting points and does not directly couple to the frame.

The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a first coupling device arranged horizontally between and directly coupled to a gearbox and a first motor; and
a second coupling device arranged horizontally between and directly coupled to the gearbox and a second motor;
wherein central axes of the first motor and the second motor are coaxially arranged with regard to one another;
wherein of the first coupling device, the second coupling device, the gearbox, the second motor, and the first motor, only the first coupling device and the second coupling device are coupled to a vehicle frame;
wherein the first coupling device comprises a first plurality of through holes that are configured to couple to the vehicle frame;
wherein the second coupling device comprises a second plurality of through holes that are configured to couple to the vehicle frame;
wherein the first plurality of through holes are positioned horizontally between sides of the first motor and a housing of the gearbox; and
wherein the second plurality of through holes are positioned horizontally between sides of the second motor and the housing of the gearbox.

2. The system of claim 1, wherein the first plurality of through holes and the second plurality of through holes face a direction perpendicular to an axis parallel to a direction of forward vehicle travel.

3. The system of claim 1, wherein the first motor is an electric motor, and wherein the vehicle frame is an electric vehicle frame.

4. The system of claim 1, wherein the first coupling device is a flange.

5. The system of claim 1, wherein the first coupling device couples to a portion of the vehicle frame above a driveshaft.

6. The system of claim 5, wherein the driveshaft extends through first and second sides of the gearbox, wherein the first coupling device is arranged on one of the first side or the second side of the gearbox.

7. An electric vehicle, comprising:
a gearbox;
a first electric motor and a second electric motor; and
a first coupling device arranged horizontally between and directly coupled to the first electric motor and the gearbox and a second coupling device arranged horizontally between and directly coupled to the second electric motor and the gearbox;
wherein central axes of the first electric motor and the second electric motor are coaxially arranged with regard to one another;
wherein the first coupling device comprises a first plurality of through holes configured to mount the first coupling device to a frame of the electric vehicle;
wherein the second coupling device comprises a second plurality of through holes configured to mount the first coupling device to the frame;
wherein the first plurality of through holes are positioned horizontally between sides of the first motor and a housing of the gearbox;
wherein the second plurality of through holes are positioned horizontally between sides of the second motor and the housing of the gearbox; and
wherein of the gearbox, the first electric motor, the second electric motor, the first coupling device, and the second coupling device, only the first coupling device and the second coupling device are coupled to the frame.

8. The electric vehicle of claim 7, wherein the second coupling device comprises a plurality of through holes arranged on opposite sides thereof, the plurality of through holes configured to mount the second coupling device to the frame of the electric vehicle via a plurality of fasteners.

9. The electric vehicle of claim 8, wherein the plurality of fasteners extend in a direction normal to a central axis of the first and second electric motors.

10. The electric vehicle of claim 7, wherein the first coupling device mounts the first electric motor to a first side of the gearbox, and wherein the second coupling device mounts the second electric motor to a second side of the gearbox.

11. A drivetrain of a vehicle, comprising:
a driveshaft;
a first electric motor;
a second electric motor;
a gearbox; and
a first coupling device directly coupled to the first electric motor and the gearbox, the first coupling device further comprising a first plurality of through holes that are configured to physically couple the first coupling device to a frame of the vehicle; and
a second coupling device directly coupled to the second electric motor and the gearbox, the second coupling device including a second plurality of through holes that are configured to physically couple the second coupling device to the frame;

wherein the first plurality of through holes are positioned horizontally between sides of the first motor and a housing of the gearbox;

wherein the second plurality of through holes are positioned horizontally between sides of the second motor and the housing of the gearbox; and wherein of the gearbox, the first electric motor, the second electric motor, the first coupling device, and the second coupling device, only the first coupling device and the second coupling device are physically coupled to the frame.

12. The drivetrain of claim 11, wherein the plurality of through holes in each of the first coupling device and the second coupling device are each configured to receive a threaded end of a bolt and physically couple the corresponding coupling device to the frame of the vehicle.

13. The drivetrain of claim 11, wherein the plurality of through holes face a direction normal to a direction of vehicle travel.

14. The drivetrain of claim 11, wherein the first coupling device comprises the plurality of through holes on opposite sides facing away from the first electric motor and the gearbox.

15. The drivetrain of claim 11, wherein the gearbox, the second electric motor, and the at least one first electric motor are free of mounting points and do not directly couple to the frame.

* * * * *